UNITED STATES PATENT OFFICE.

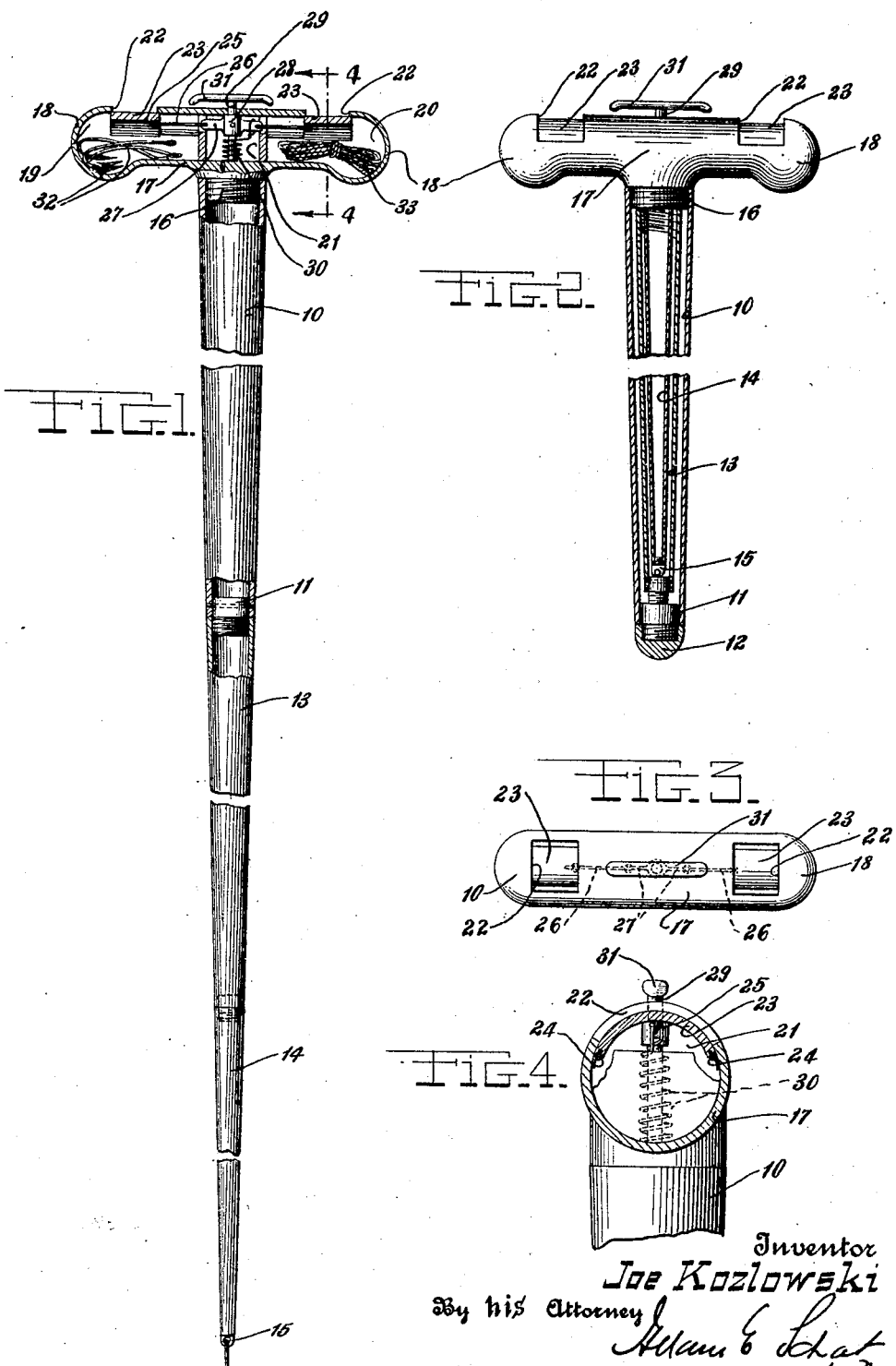

JOE KOZLOWSKI, OF TOLEDO, OHIO.

COMBINED CANE AND FISHING-ROD.

1,324,554.  Specification of Letters Patent.  Patented Dec. 9, 1919.

Application filed July 2, 1919. Serial No. 308,186.

*To all whom it may concern:*

Be it known that I, JOE KOZLOWSKI, a citizen of Poland, residing at 2830 Warsaw street, Toledo, county of Lucas, and State of Ohio, have invented certain new and useful Improvements in Combined Canes and Fishing-Rods, of which the following is a specification.

This invention has for its object the provision of a cane combined with elements whereby it may be used as a fishing rod.

A further object is to provide means contained within the head, in which hooks, lines and other accessories may be conveniently disposed until they are desired for use.

These and other like objects are attained by the novel construction and combination of parts hereinafter described, and shown in the accompanying drawings, forming a material part of this disclosure, and in which—

Figure 1 is a side elevational view showing a combined cane and fishing rod made in accordance with the invention and extended at full length, parts being broken away in order to disclose the interior construction.

Fig. 2 is a similar view of the same when the device is in a closed condition and used as a walking cane.

Fig. 3 is a top plan view thereof, and

Fig. 4 is an enlarged fragmentary sectional view taken on line 4—4 of Fig. 1.

Referring to the drawings in detail, a conical tube 10 is fitted with a removable plug 11 at its lower end to which may be attached a tip 12, or the conical section 13 of the fishing rod attachment, which in turn is engaged with another section or lower element 14, terminating in an eye 15, with which the fishing line may be engaged, the sections 13 and 14 being separable and readily contained within the main body 10 as best shown in Fig. 2, or when extended at length, as shown in Fig. 1, present a tapering fish rod having characteristic lightness and strength.

Engaged in the upper, larger end of the conical body 10 is a screw threaded plug 16, formed with a transverse handle 17, having enlarged globular ends 18, the head being hollow and formed into compartments 19 and 20, a central compartment 21 registering with the body 10.

Formed through the upper portion of the handle are openings 22, normally covered on the inner sides by curved plates 23, slidable along their lateral edges in guideways 24, while upon their adjacent edges are fixed eyes 25, connected by links 26, with a pair of oppositely extending arms 27, formed with a hub 28, fixed on a spindle 29, extending through the top of the handle 17, and rotatably mounted therein, the lower end of the spindle being encircled by a coiled torsional spring 30, one end of which is engaged in the arms 27, and the other fixed in the lower portion of the handle as shown in Fig. 1.

Secured upon the upper end of the spindle 29 is a transverse handle bar 31, by which the arms may be rotated, thereby drawing the covers inwardly and permitting entrance to the compartments 19 and 20, the former of which may contain ordinary hooks 32, while a line 33 is receivable within the opposite compartment 20.

The operation of detaching the element from the position indicated in Fig. 2 will be obvious, and it will be equally apparent that the same may be extended into the position shown in Fig. 1.

Whenever it is desired to obtain a hook or fishing line, the handle bar 31 is turned, relative to the cane handle 17, opposing the spring 30 so that the fingers of an operator may be entered into the spaces, and the desired article extracted, whereupon the effect of the spring is to rotate the spindle 29 and move the cover plates outward, preventing loss of material or exposure of the same.

Having thus described my invention what I claim as new and desire to secure by Letters Patent, is—

1. In a combined cane and fishing rod, a casing having a hollow conical body, a hollow head transversely secured thereon, said head containing compartments and openings leading thereto, slides adapted to cover said openings, means for operating said slides simultaneously, and means for holding said slides in a normally closed position.

2. In a combined cane and fishing rod, the combination with a hollow conical body, a hollow transverse head engaged with the larger end of said body, compartments formed in said head, said compartments having openings at the top of said handle, a spindle rotatably mounted in said handle axially with said body, means for manually operating said spindle, arms extending oppositely from said spindles within said handle, covers adapted to close said openings, connections between said covers and said arms, whereby they may be operated, and means for resiliently maintaining said covers in a closed position.

In testimony whereof I have affixed my signature.

JOE KOZLOWSKI.